(12) United States Patent
Ogawa et al.

(10) Patent No.: US 12,304,477 B2
(45) Date of Patent: *May 20, 2025

(54) CONTROL DEVICE, CONTROL METHOD, AND RECORDING MEDIUM

(71) Applicants: TRANSTRON INC., Yokohama (JP); KOGAKUIN UNIVERSITY, Tokyo (JP)

(72) Inventors: Masatoshi Ogawa, Yokohama (JP); Takuma Degawa, Yokohama (JP); Masakazu Mukai, Shinjuku (JP); Shigeaki Kurita, Yokohama (JP)

(73) Assignees: TRANSTRON INC., Yokohama (JP); KOGAKUIN UNIVERSITY, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 17/972,873

(22) Filed: Oct. 25, 2022

(65) Prior Publication Data
US 2023/0138137 A1    May 4, 2023

(30) Foreign Application Priority Data
Oct. 29, 2021 (JP) .................. 2021-177303

(51) Int. Cl.
*B60W 50/00* (2006.01)
*B60W 30/095* (2012.01)

(52) U.S. Cl.
CPC .... *B60W 30/0956* (2013.01); *B60W 50/0097* (2013.01); *B60W 2050/0022* (2013.01);
(Continued)

(58) Field of Classification Search
CPC ..... B60W 50/0097; B60W 2554/4042; B60W 2420/408; B60W 2050/0022;
(Continued)

(56) References Cited

U.S. PATENT DOCUMENTS

| | | | | |
|---|---|---|---|---|
| 5,973,732 A | * | 10/1999 | Guthrie | G06V 20/53 348/169 |
| 11,577,722 B1 | * | 2/2023 | Packer | G05D 1/0088 |

(Continued)

FOREIGN PATENT DOCUMENTS

JP    2008-502034 A    1/2008

OTHER PUBLICATIONS

Joakim Haugen et al/, "Monitoring Moving Objects Using Aerial Mobile Sensors," in IEEE Transactions on Control Systems Technology, vol. 24, No. 2, pp. 475-486, Mar. 2016, doi: 10.1109/TCST.2015.2454432.*

(Continued)

*Primary Examiner* — Gertrude Arthur Jeanglaude
(74) *Attorney, Agent, or Firm* — STAAS & HALSEY LLP (57) ABSTRACT

A control device calculates a first estimate value of a first monitored amount of a mobile object, from sensor information of a controlled object, using a transformed first model obtained by transformation of a first model having a multilayered neural structure and activation functions of a ReLU structure, and predicting dynamic behavior of the mobile object. The transformed first model is a model for which weight coefficients, biases, and upper and lower limit values of input/output variables of neurons are set based on the first model and in which activation functions of the neurons are transformed using a linear inequality function having a binary variable. The control device calculates a second estimate value of a second monitored amount of the controlled object from a candidate value of an operation amount for controlling the second monitored amount. The control device determines a value of the operation amount based on a target value of the second monitored amount, the second estimate value, and the first estimate value.

17 Claims, 7 Drawing Sheets

(52) U.S. Cl.
CPC . *B60W 2420/403* (2013.01); *B60W 2420/408* (2024.01); *B60W 2420/54* (2013.01); *B60W 2510/18* (2013.01); *B60W 2510/20* (2013.01); *B60W 2520/10* (2013.01); *B60W 2520/105* (2013.01); *B60W 2554/4042* (2020.02)

(58) Field of Classification Search
CPC ....... B60W 2420/403; B60W 2420/54; B60W 2510/18; B60W 2510/20; B60W 2520/10; B60W 2520/105
See application file for complete search history.

(56) References Cited

U.S. PATENT DOCUMENTS

| | | | |
|---|---|---|---|
| 11,746,718 B2* | 9/2023 | Ogawa | ................ F02D 41/0077 701/108 |
| 2003/0123703 A1* | 7/2003 | Pavlidis | ........... G08B 13/19608 382/103 |
| 2007/0143074 A1 | 6/2007 | Gallestey et al. | |
| 2019/0035275 A1* | 1/2019 | Nishi | ..................... G08G 1/163 |

OTHER PUBLICATIONS

Balázs Németh et al.; "The Design of Performance Guaranteed Autonomous Vehicle Control for Optimal Motion in Unsignalized Intersections"; Institute for Computer Science and Control; Applied Sciences MDPI; 2021, 11, 3464, http://doi.org/10.3390/app11083464; Apr. 13, 2021; (20 pages).

Jiachen Li et al; "Generic Tracking and Probabilistic Prediction Framework and Its Application in Autonomous Driving"; IEEE Transactions on Intelligent Transportation Systems; ARXIV.org, Cornell University; Aug. 23, 2019; XP081469069, DOI: 10.1109/TITS.2019.2930310; (16 pages).

Extended European Search Report dated Mar. 14, 2023 in related European Patent Application No. 22203804.4 (9 pages).

* cited by examiner

CONTROL DEVICE, CONTROL METHOD, AND RECORDING MEDIUM

CROSS REFERENCE TO RELATED APPLICATIONS

This application is based upon and claims the benefit of priority of the prior Japanese Patent Application No. 2021-177303, filed on Oct. 29, 2021, the entire contents of which are incorporated herein by reference.

FIELD

The embodiments discussed herein are related to a control device, a control method, and recording medium.

BACKGROUND

In autonomous driving control of an automotive vehicle, efforts are being made to realize high performance control by using deep learning of artificial intelligence (AI) to detect a mobile object (obstacle) from onboard camera and/or radar information and reproduce a mobile object predictive model that predicts a future behavior. Autonomous driving control of an automotive vehicle, for example, is realized by performing optimal control of multiple variables using a multi-layered neural network (NN) model (multi-input multi-output model of a mobile object).

For example, according to one conventional technique for modeling an industrial process, a single combined mixed logical dynamic (MLD) subsystem is built by merging two interconnected MLD subsystems. For example, refer to Published Japanese-Translation of PCT Application, Publication No. 2008-502034.

SUMMARY

According to an aspect of an embodiment, a control device includes: a transformed first model for which a weight coefficient, a bias, and upper and lower limit values of an input/output variable of a neuron are set based on a first model and in which an activation function of the neuron is transformed using a linear inequality function that includes a binary variable, the first model having a multi-layered neural structure and the activation function of a rectified linear unit (ReLU) structure, the first model receiving, as input, information of a sensor equipped on a controlled object, the first model predicting dynamic behavior of a mobile object in a surroundings of the controlled object; a memory; and a processor coupled to the memory, the processor configured to: obtain the information of the sensor and a target value of a monitored amount of the controlled object; use the transformed first model to calculate an estimate value, as a future value, of a monitored amount of the mobile object, from the information of the sensor; calculate an estimate value, as a future value, of the monitored amount of the controlled object, from a candidate value of an operation amount for controlling the monitored amount of the controlled object; and determine a value of the operation amount for controlling the monitored amount of the controlled object, based on the target value of the monitored amount of the controlled object, the estimate value of the monitored amount of the controlled object, and the estimate value of the monitored amount of the mobile object.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2BA is a diagram of an example of transformation of the mobile object predictive model.

FIG. 2BB is a diagram of the example of transformation of the mobile object predictive model.

DESCRIPTION OF THE INVENTION

First, problems associated with the conventional techniques are discussed. In the conventional techniques, optimal control of multiple variables using a multi-layered neural network model takes a great deal of computing time and thus, autonomous driving of an automotive vehicle, etc. in real-time is difficult.

Embodiments of a control device, a control method, and a control program according to the invention are described with reference to the accompanying drawings.

Figure 1:
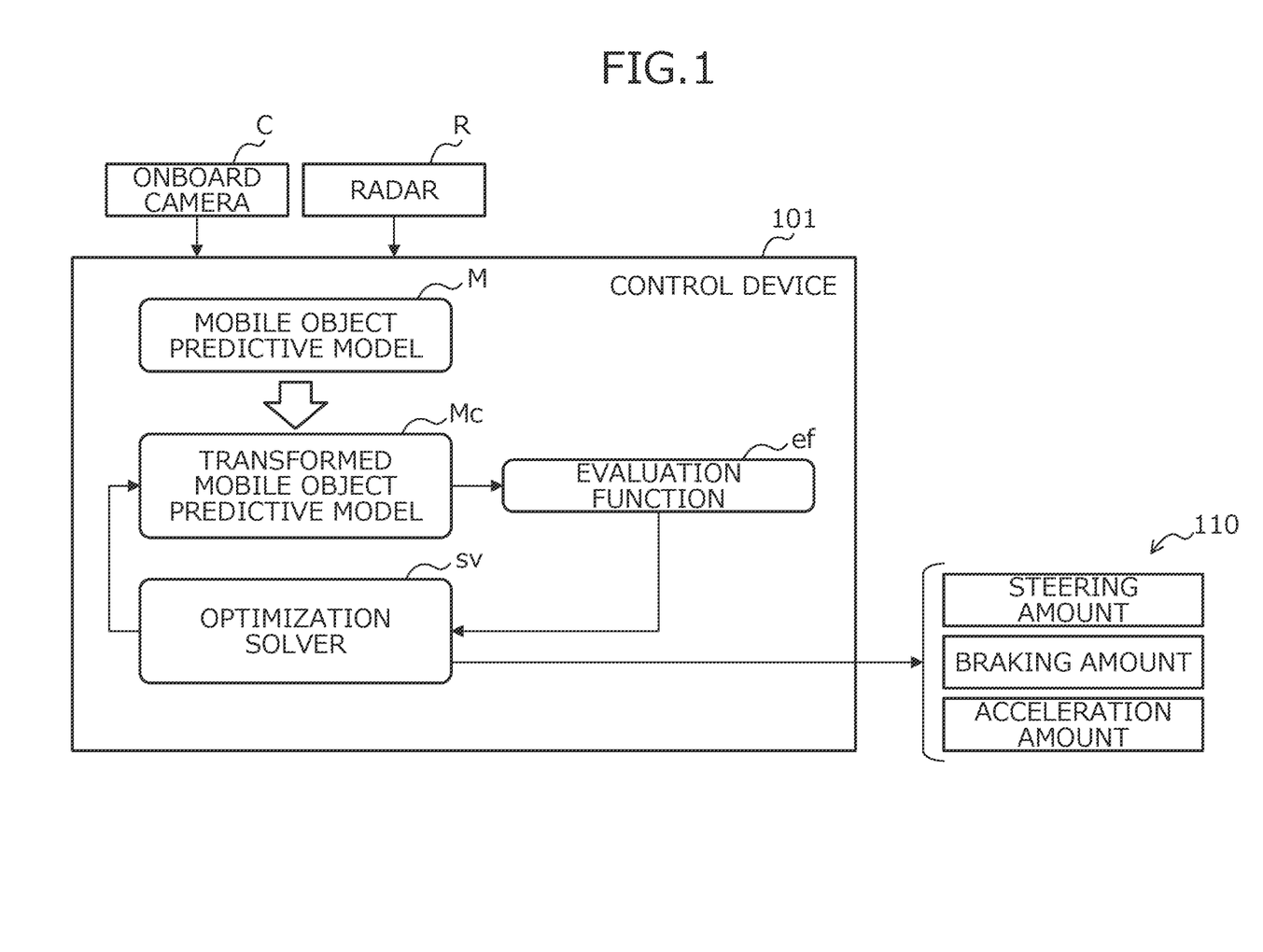
FIG. 1 is a diagram depicting an example of a control method according to an embodiment.

FIG. 1 is a diagram depicting an example of a control method according to an embodiment. In FIG. 1, a control device 101 is a computer configured to control a controlled object. The controlled object, for example, is a mobile object such as an automotive vehicle or a drone (unmanned aerial vehicle). Control of the controlled object is the control of, for example, a braking amount, an acceleration amount, a steering amount, and/or the like.

Here, a mobile object predictive model of a multi-layered neural network (NN) may be used to detect a mobile object (obstacle) around (in the surroundings of) an automotive vehicle and predict a future behavior. The mobile object (obstacle) is, for example, another automotive vehicle, a pedestrian, a bicycle, or the like. To accurately replicate behavior of the mobile object (obstacle), the number of variables to be considered increases, whereby the scale of the mobile object predictive model increases. Therefore, in the conventional techniques, when optimal control of multiple variables is performed using a mobile object predictive model, a great deal of computing time is necessary.

Further, existing mobile object predictive models are nonlinear dynamic systems that include characteristics such as primary delay, secondary delay, wasted time, etc. and derivation of a mathematical model of an inverse function by mathematical processes is difficult. Therefore, a problem arises in that analytical problem solving is impossible and the computational load is high. Accordingly, with the conventional techniques, implementation of a mobile object predictive model in, for example, an autonomous driving control unit of an automotive vehicle and performing real-time onboard control is difficult.

Thus, in the present embodiment, a control method is described that realizes high-performance, high-speed autonomous driving control by predicting dynamic behavior of a mobile object and searching for an operation amount for controlling a monitored amount of a controlled object, by using a transformed mobile object predictive model Mc (transformed first model) obtained by using a linear inequality function that includes a binary variable, to transform a mobile object predictive model M (first model) having an activation function of a rectified linear unit (ReLU) (rectified linear function) structure. Hereinafter, an example of processing by the control device 101 is described.

The control device 101 obtains the transformed first model, which is the first model that has been transformed. Here, the first model is a model that predicts dynamic behavior of a mobile object around the controlled object. The first model has a multi-layered neural structure and an activation function of ReLU structure.

The ReLU structure is a function whose output value is 0 when an input value input to the function is 0, the output value varying linearly when the input value is greater than 0. The first model receives, as input, information of a sensor mounted on the controlled object and outputs a future value (estimate value) of a monitored amount of a mobile object. The monitored amount of the mobile object is, for example, a path of travel, speed, fuel consumption, etc. The sensor is an apparatus for detecting an obstacle around the controlled object and, for example, is a radar, a camera, etc.

The first model enables highly accurate replication of dynamic behavior of the mobile object around the controlled object. On the other hand, in autonomous driving control, when the first model is used as is, the computing time for optimal control may increase. Therefore, to realize high-performance, high-speed autonomous driving control, the control device 101 obtains the transformed first model, which is the first model that has been transformed.

The transformed first model is a model for which a weight coefficient, bias, and upper and lower limit values of input/output variables of each neuron (node) are set based on the first model and for which an activation function of each neuron has been transformed using a linear inequality function containing a binary variable. The weight coefficient and bias represent a relationship between the input and output of each neuron (node). The weight coefficient indicates a weight for input. The bias is used to bias an input value within a certain range.

An input/output variable, for example, is a variable input to the model itself, a variable output from the model itself, a variable output from each neuron in the model, etc. The upper and lower limit values of an input/output variable, for example, are obtained by providing an exhaustive test pattern such as a chirp signal or amplitude pseudo random binary signal (APRBS) to the first model and are set based on a maximum value and a minimum value of the input/output variable.

In the description hereinafter, the first model may be indicated as "mobile object predictive model M" and the transformed first model may be indicated as "transformed mobile object predictive model Mc".

Here, an example of transformation of the mobile object predictive model M is described with reference to FIGS. 2A and 2B. The mobile object predictive model M, for example, is created in advance.

Figure 2:
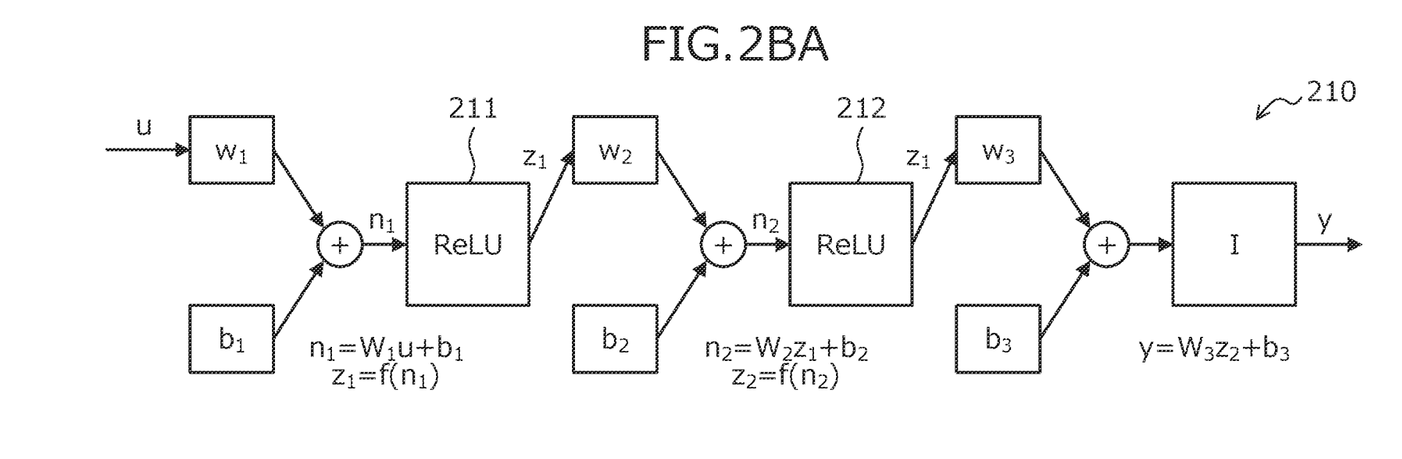
Figure 2A:
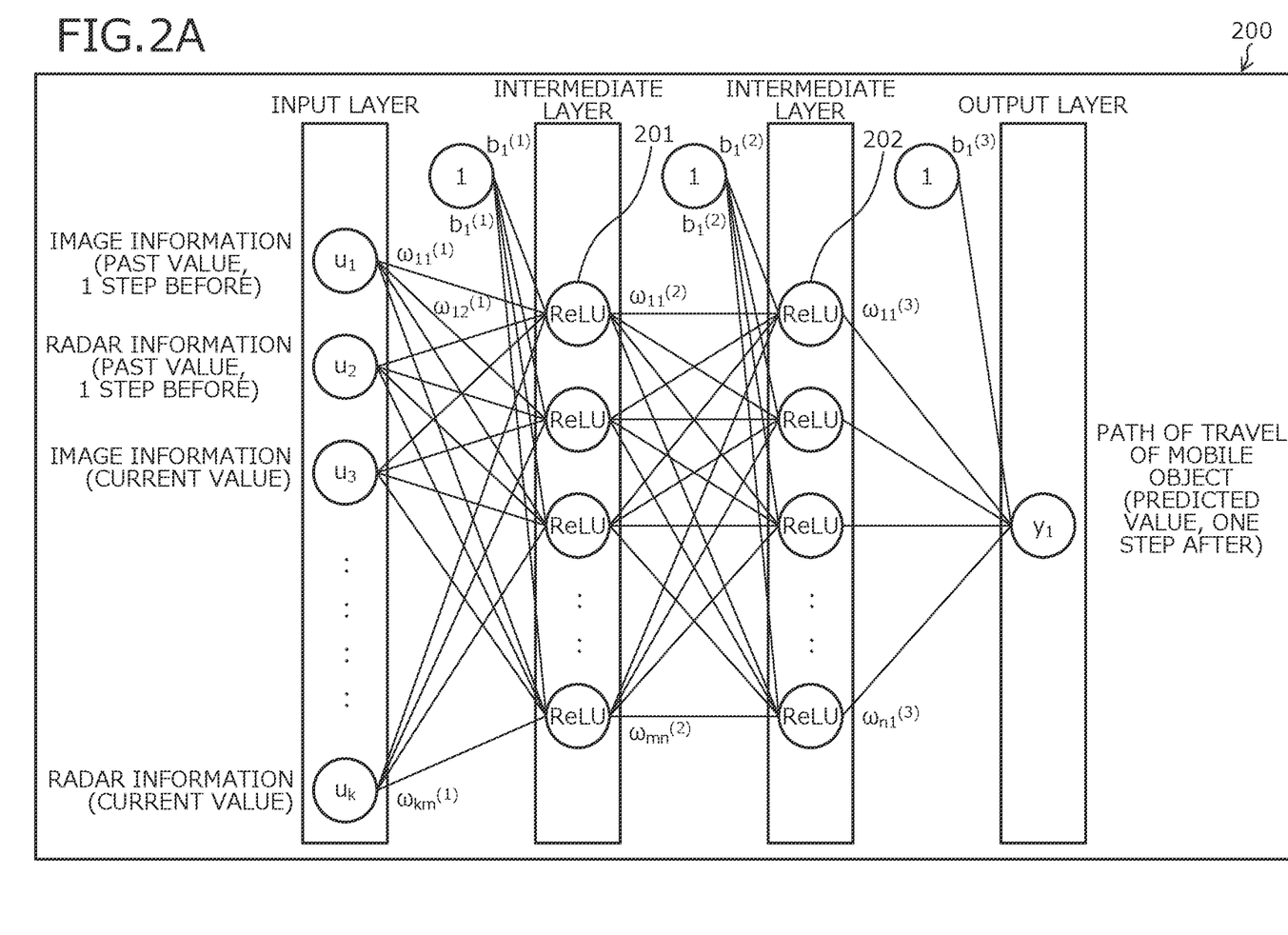
FIG. 2A is a diagram depicting an example of a mobile object predictive model.

FIG. 2A is a diagram depicting an example of the mobile object predictive model. In FIG. 2A, a mobile object predictive model 200 is one example of the mobile object predictive model M and has a multi-layered neural structure and activation functions of a ReLU structure. The mobile object predictive model 200 receives input of image information (current value, past value) and radar information (current value, past value) and outputs an estimate value (future value) of a monitored amount of the mobile object. The past value, for example, is the value one step before.

Here, description is given taking an example in which a path of travel (predicted value thereof, for the next step) of the mobile object is output as the estimate value of the monitored amount of the mobile object. The image information, for example, is image information of an onboard camera C equipped on a vehicle body (automotive vehicle) constituting the controlled object. The onboard camera C is an imaging device that captures images of the surroundings of the vehicle body. The radar information, for example, is information of a radar R equipped on the vehicle body (automotive vehicle) constituting the controlled object.

The radar R is a device that measures position and/or direction by emitting radio waves and receiving the radio waves that hit an obstacle and are reflected back. The radar R, for example, may be at least any one of light detection and ranging (LiDAR), millimeter wave radar, and an ultrasonic sensor. The path of travel of the mobile object is a path along which the mobile object moves during a period spanning into the future from the current time.

In the mobile object predictive model 200, for example, nodes 201, 202 are an example of neurons that include a ReLU function. The ReLU function is an activation function of a ReLU structure. Further, "$\omega_{11}^{(1)}$" represents a weight applied to input that is input to the node 201 from "$u_1$". Further, "$b_1^{(1)}$" represents bias of the node 201.

FIGS. 2BA and 2BB are diagrams depicting an example of transformation of the mobile object predictive model. In FIG. 2BA, the mobile object predictive model 210 is a simplified depiction of the mobile object predictive model 200 depicted in FIG. 2A. Further, FIG. 2BB depicts a portion excepted from the mobile object predictive model 210.

In the mobile object predictive model 210, for example, a ReLU function 211 represents the activation function of the node 201 (refer to FIG. 2A). "$w_1$" represents a weight applied to input of the node 201 from "u". "$b_1$" represents bias of the node 201. Further, a ReLU function 212 represents the activation function of the node 202 (refer to FIG. 2A). "$w_2$" represents a weight applied to input of the node 202 from the node 201. "$b_2$" represents bias of the node 202. Further, "l" represents a linear function.

The control device 101, for example, uses propositional logic to transform each ReLU function. A ReLU function, for example, is expressed using formula (1) below.

$$y = f(x) = \max\{0, x\} = \begin{Bmatrix} x(x > 0) \\ 0(x \leq 0) \end{Bmatrix} \quad (1)$$

To express conditions of case division, the control device 101 substitutes a binary variable δ into the ReLU function as shown in formulae (2) and (3) below. The binary variable δ is a variable (0-1 variable) that takes on only two values, "0" and "1".

$$[f(x) \leq 0] \Leftrightarrow [\delta = 1] \quad (2)$$

$$[f(x) > 0] \Leftrightarrow [\delta = 0] \quad (3)$$

The propositional logic described above is equivalent to true instances of inequalities (4) and (5) below. Where, M is a maximum value of f(x). "m" is a minimum value of f(x). "ε" is computer accuracy. The control device 101 sets the maximum value of the variable output from each of the neurons of the non-transformed mobile object predictive model 210 as "M" (upper limit of variable output from each neuron). Further, the control device 101 sets the minimum value of the variable output from each of the neurons of the non-transformed mobile object predictive model 210 as "m" (lower limit of variable output from each neuron).

$$f(x) \leq M(1-\delta) \quad (4)$$

$$f(x) \geq \varepsilon + (m-\varepsilon)\delta \quad (5)$$

The binary variable δ is used, whereby "y" may be expressed as formula (6) below.

$$y = (1-\delta)f(x) \quad (6)$$

Inequalities equivalent to formula (6) above are, for example, inequalities (7) to (10) below.

$$y \leq M(1-\delta) \quad (7)$$

$$y \geq m(1-\delta) \quad (8)$$

$$y \leq f(x) - m\delta \quad (9)$$

$$y \geq f(x) - M\delta \quad (10)$$

The control device 101, for example, applies the transformation to all the ReLU functions described above and thereby, transforms the mobile object predictive model 210.

A mobile object predictive model 220 is an example of the transformed mobile object predictive model Mc and is a transformed mobile object predictive model, which is the mobile object predictive model 210 after transformation thereof. The mobile object predictive model 220 receives input of image information (current value, past value) and radar information (current value, past value) and outputs a future path of travel of the mobile object (estimate value). FIG. 2BB depicts an excerpted portion of the mobile object predictive model 220.

The control device 101 sets a weight coefficient and bias (for example, $w_1$, $b_1$) of each neuron (for example, the node 201) of the non-transformed mobile object predictive model 220, as a weight coefficient and bias of each neuron of the transformed mobile object predictive model 220. Further, the control device 101 sets upper and lower limit values of a variable (for example, u) input to the non-transformed mobile object predictive model 220, as upper and lower limit values of a variable input to the transformed mobile object predictive model 220. Further, the control device 101 sets upper and lower limit values of a variable (for example, y) output from the non-transformed mobile object predictive model 220, as upper and lower limit values of a variable output from the transformed mobile object predictive model 220.

As a result, the control device 101 may obtain the transformed mobile object predictive model 220, which is the mobile object predictive model 210 after transformation thereof. The mobile object predictive model 220 enables use of an algorithm capable of high-speed problem (mixed integer programming problem) solving and therefore, enables suppression of the computational load. Further, the problem space may be limited, whereby the solution space is reduced and the search time may be shortened.

Nonetheless, the transformation of the mobile object predictive model 210 may be performed by another computer different from that of the control device 101. In this instance, the control device 101 obtains the transformed mobile object predictive model 220 by, for example, a user input operation or receives the transformed mobile object predictive model 220 from another computer.

The control device 101 obtains information of the sensor equipped on the controlled object and a target value of the monitored amount of the controlled object. In particular, for example, the control device 101 obtains image information from the onboard camera C equipped on the controlled object. The image information, for example, is information indicating an image captured by the onboard camera C.

Further, the control device 101 obtains radar information from the radar R equipped on the controlled object. The radar information, for example, is a measurement result indicating position and/or direction of the mobile object (obstacle) present around the controlled object. The monitored amount of the controlled object, for example, is the path of travel, speed, fuel consumption, etc. of the controlled object.

The path of travel of the controlled object is a path along which the controlled object moves during the period spanning into the future from the current time. The speed of the controlled object is the speed at which the controlled object moves during the period spanning into the future from the current time. The fuel consumption of the controlled object is the amount of fuel consumed by the controlled object (energy consumption) during the period spanning into the future from the current time.

The target value of the monitored amount, for example, is a value of the monitored amount set according to road conditions. The target value of the monitored amount, for example, is a target speed or a target path of travel of the vehicle body enroute to a destination. In particular, for example, the control device 101 obtains the target path of travel and/or the target speed of the vehicle body (target value of the monitored amount), from a navigation system of the vehicle body, which is the controlled object.

The control device 101 uses the transformed mobile object predictive model Mc to calculate an estimate value (future value) of the monitored amount of the mobile object, from the obtained information of the sensor. In particular, for example, the control device 101 inputs the obtained image information of the onboard camera C and radar information of the radar R into the transformed mobile object predictive model Mc and thereby, calculates the estimate value of the monitored amount of the mobile object. The monitored amount of the mobile object, for example, is the path of travel, speed, fuel consumption, etc. of the mobile object.

The control device 101 calculates an estimate value (future value) of the monitored amount of the controlled object, from a candidate value of the operation amount for controlling the monitored amount of the controlled object. The operation amount for controlling the monitored amount of the controlled object, for example, is the steering amount, the braking amount, the acceleration amount, etc. The candidate value of the operation amount, for example, is a random value.

In particular, for example, the control device 101 uses a second model to calculate an estimate value (future value) of the monitored amount of the controlled object, from a candidate value of the operation amount for controlling the monitored amount of the controlled object. Here, the second model is a model that receives the operation amount of the controlled object as input and predicts dynamic behavior of the controlled object.

The second model is a mathematical model built based on laws of physics, such as equations of motion. For example, the second model receives the steering amount, the braking amount, and the acceleration amount of the vehicle body, which is the controlled object, as input and outputs an estimate value of the monitored amount of the vehicle body. An existing model may be used as the second model.

Based on the obtained target value of the monitored amount of the controlled object, the calculated estimate value of the monitored amount of the controlled object, and the calculated estimate value of the monitored amount of the mobile object, the control device 101 determines a value of the operation amount for controlling the monitored amount of the controlled object. In particular, for example, based on the estimate value of the monitored amount of the controlled object, the target value of the monitored amount of the controlled object, and the estimate value of the monitored amount of the mobile object, the control device 101 calculates a control evaluation value for each candidate value of the operation amount.

Here, the control evaluation value represents the cost for controlling the monitored amount of the controlled object. For example, the lower is the control evaluation value, the higher is the evaluation. Further, based on the calculated control evaluation values, the control device 101 determines the value of the operation amount for controlling the monitored amount of the controlled object, from among the candidate values of the operation amount.

To explain in more detail, for example, the control device 101, by an optimization solver sv, uses the transformed mobile object predictive model Mc while changing the candidate values of the operation amount and thereby, calculates the estimate value of the monitored amount of the controlled object. The optimization solver sv, for example, is a software that uses a dual-simplex algorithm to solve problems. Next, the control device 101, for example, uses an evaluation function ef to calculate a control evaluation value, based on the estimate value of the monitored amount of the controlled object, the target value of the monitored amount of the controlled object, and the estimate value of the monitored amount of the mobile object.

The evaluation function ef, for example, is a cost function that includes a term that takes into consideration, error of the estimate value of the monitored amount of the controlled object (path of travel, speed) with respect to the target value of the monitored amount of the controlled object (path of travel, speed), and a term that takes into consideration, a positional relationship between the controlled object and the mobile object. The positional relationship of the controlled object and the mobile object is identified by the estimate value of the monitored amount of the controlled object (path of travel, speed) and the estimate value of the monitored amount of the mobile object (path of travel, speed). Each term may be normalized to appropriately compare values between terms or may be weighted according to the priority of the term.

Further, the control device 101 determines the candidate value of the operation amount for which the control evaluation value (cost) is smallest to be the value of the operation amount for controlling the monitored amount of the controlled object at the next step. As a result, for example, a value of the operation amount to avoid collisions with the mobile object (obstacle) and bring the monitored amount of the controlled object as close as possible to the target value may be determined.

The control device 101 outputs the determined value of the operation amount. In particular, for example, the control device 101 outputs operation amount information 110 to the vehicle body, which is the controlled object, as information of the operation amount when the monitored amount is controlled at the next step. Here, the operation amount information 110 is information indicating the determined value of the operation amount and, for example, indicates values of the steering amount, the braking amount, and the acceleration amount.

In this manner, according to the control device 101, high-performance, high-speed autonomous driving control that uses a model (the transformed mobile object predictive model Mc) capable of accurately predicting dynamic behavior of a mobile object around the controlled object may be realized. For example, according to the control device 101, autonomous driving control may be performed that avoids collisions with the mobile object (obstacle) and conforms as much as possible to the target values for the path of travel, speed, etc. of the vehicle body, which is the controlled object.

Further, according to the control device 101, the mobile object predictive model of a multi-layered neural network is converted into a formula using a linear inequality function, whereby optimization problems may be solved analytically. Further, the activation function, which may be transformed into a linear inequality function, for example, is a ReLU, Hadlims, Satlins, tribas, etc. Of these activation functions, an activation function of the ReLU structure is used in the mobile object predictive model, whereby highly accurate prediction of dynamic behavior of the mobile object may be realized.

An example of hardware configuration of the control device 101 is described.

Figure 3:
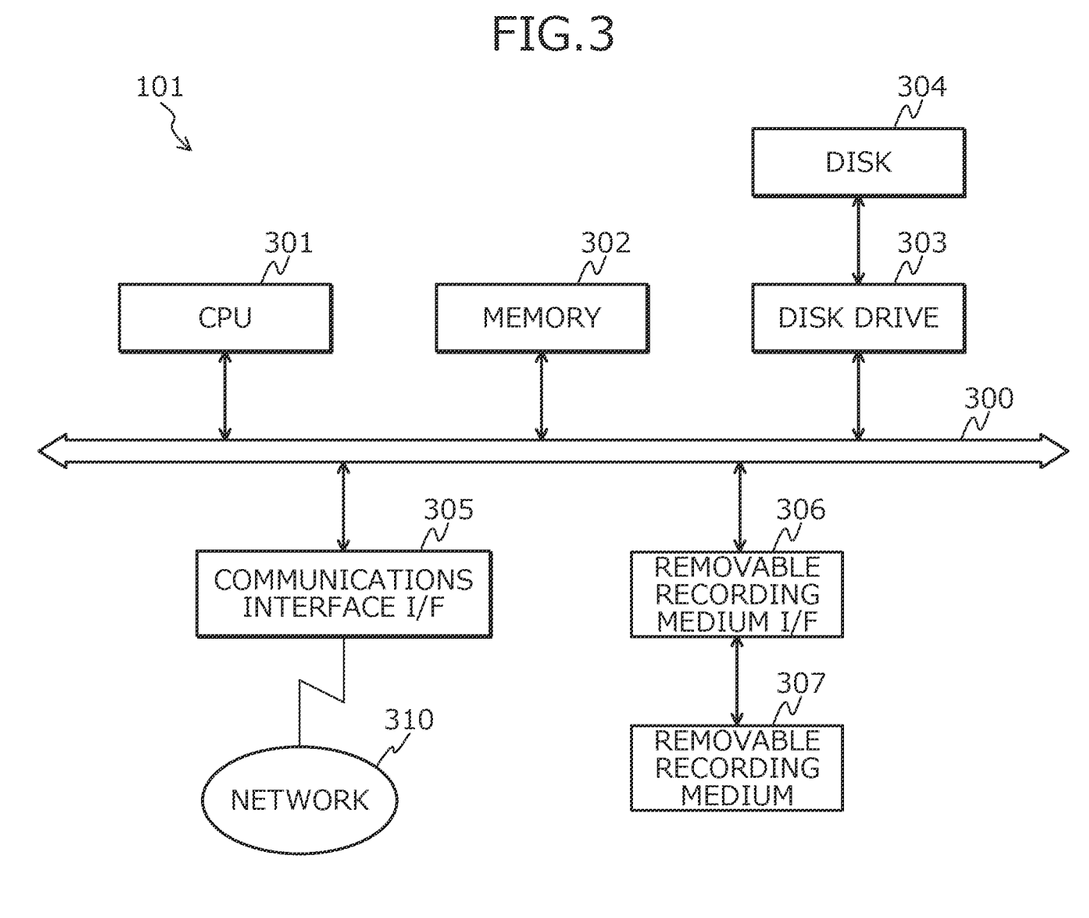
FIG. 3 is a block diagram depicting an example of a hardware configuration of a control device 101.

FIG. 3 is a block diagram depicting an example of the hardware configuration of the control device 101. In FIG. 3, the control device 101 has a central processing unit (CPU) 301, a memory 302, a disk drive 303, a disk 304, a communications interface (I/F) 305, a removable recording medium I/F 306, and a removable recording medium 307. Further, the components are connected to one another by a bus 300.

Here, the CPU 301 governs overall control of the control device 101. The CPU 301 may have multiple cores. The memory 302 includes, for example, a read-only memory (ROM), a random access memory (RAM), and a flash ROM, etc. In particular, for example, the flash ROM stores OS programs, the ROM stores application programs, and the RAM is used as a work area of the CPU 301. Programs stored in the memory 302 are loaded onto the CPU 301, whereby encoded processes are executed by the CPU 301.

The disk drive 303 controls the reading and writing of data with respect to the disk 304, under the control of the CPU 301. The disk 304 stores the data written thereto under the control of the disk drive 303. The disk 304 may be, for example, a magnetic disk, an optical disk, etc.

The communications I/F 305 is connected to a network 310 through a communications line and is connected to an external computer via the network 310. Further, the communications I/F 305 implements an interface between the network 310 and the device and controls the input and output of data with respect to an external computer. As the communications I/F 305, for example, a modem, a LAN adapter, etc. may be adopted.

The removable recording medium I/F 306 controls the reading and writing of data with respect to the removable recording medium 307, under the control of the CPU 301. The removable recording medium 307 stores therein data written thereto under the control of the removable recording medium I/F 306. The removable recording medium 307 may be, for example, a Compact Disc (CD)-ROM, a Digital Versatile Disk (DVD), a Universal Serial Bus (USB) memory, etc.

In addition to the components above, the control device 101 may have, for example, an input apparatus, a display, etc. Further, of the components described above, the control device 101, for example, may omit the disk drive 303, the disk 304, the removable recording medium I/F 306, and/or the removable recording medium 307.

Figure 4:
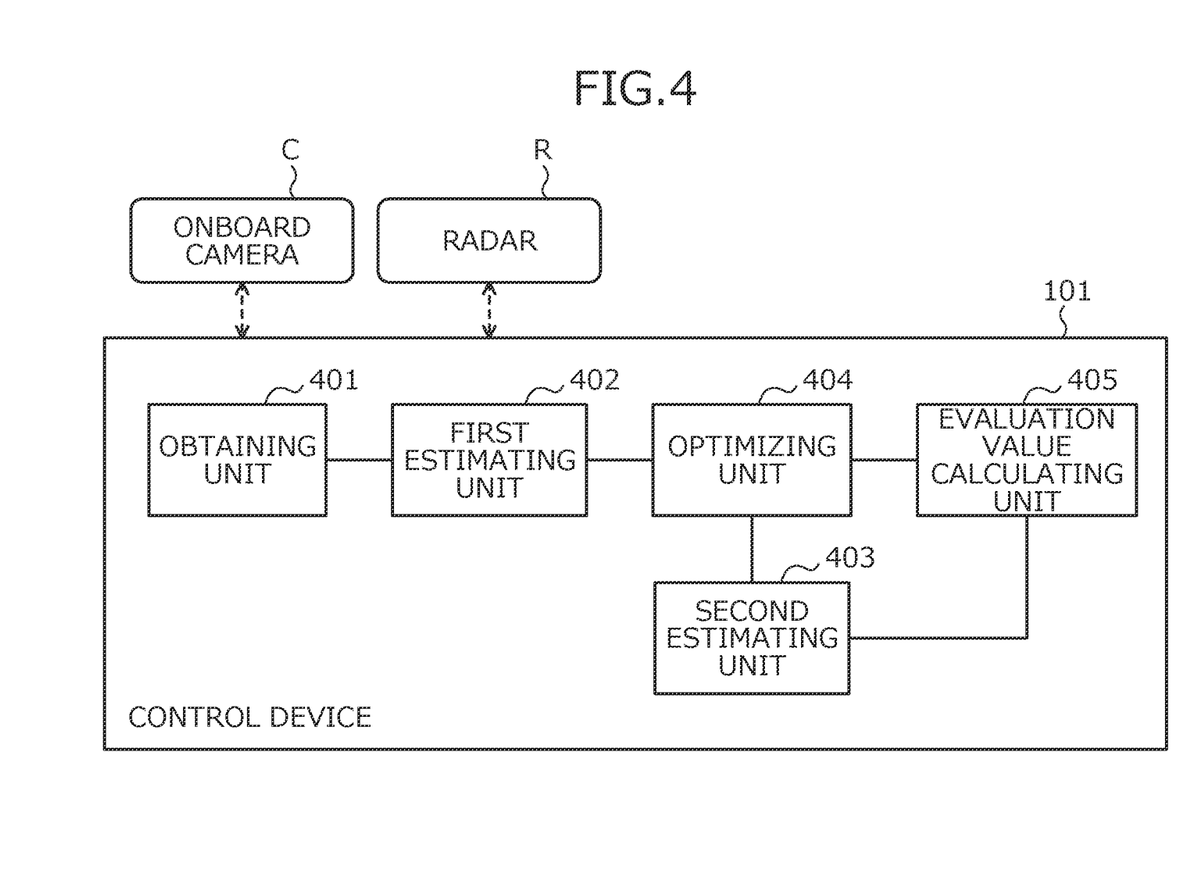
FIG. 4 is a block diagram depicting an example of a functional configuration of the control device 101.

FIG. 4 is a block diagram depicting an example of a functional configuration of the control device 101. In FIG. 4, the control device 101 includes an obtaining unit 401, a first estimating unit 402, a second estimating unit 403, an optimizing unit 404, and an evaluation value calculating unit 405. The obtaining unit 401 to the evaluation value calculating unit 405 are functions constituting a controller and in particular, for example, are implemented by executing on the CPU 301, a program stored in a storage apparatus such as the memory 302, the disk 304, and the removable recording medium 307 depicted in FIG. 3, etc., or by the communications I/F 305. Processing results of the functional units, for example, are stored to a storage apparatus such as the memory 302, the disk 304, etc.

The obtaining unit 401 obtains information of the sensor equipped on the controlled object. In the description hereinafter, as the controlled object, an "automotive vehicle (vehicle body)" is described as an example. Further, as the sensor equipped on the controlled object, the "onboard camera C" and the "radar R" are described as example.

In particular, for example, the obtaining unit 401 obtains image information from the onboard camera C equipped on the vehicle body on which the control device 101 of the obtaining unit 401 is provided. The image information, for example, is information indicating an image captured by the onboard camera C and, for example, is a moving image (time-series data) of a most recent fixed period from a past time to the current time. Further, the obtaining unit 401 obtains radar information from the radar R equipped on the vehicle body. The radar information, for example, is information indicating the position, direction, etc. of a mobile object (obstacle) present in the surroundings of the vehicle body, measured by the radar R and, for example, is a measurement result (time-series data) for the most recent fixed period.

Further, the obtaining unit 401 obtains a target value of the monitored amount of the vehicle body (controlled object). The target value of the monitored amount, for example, is a target path of travel, a target speed, etc. of the vehicle body. The target path of travel of the vehicle body is a path targeted when the vehicle body moves during a period spanning into the future from the current time (for example, 5 seconds). The target speed of the vehicle body is the target speed when the vehicle body moves during the period spanning into the future from the current time. The target speed, for example, may be an average speed or may be a speed per fixed period (1 second, etc.).

In particular, for example, the obtaining unit 401 obtains the target path of travel and the target speed of the vehicle body, from the navigation system of the vehicle body (not depicted). A navigation system is a system that displays the current location of an automotive vehicle on a map, the distance, direction, etc. to a destination, etc. to support driving of a driver. The navigation system, for example, calculates the target path of travel, the target speed, etc. of the vehicle body, according to conditions of the road along which the vehicle body travels.

The first estimating unit 402 uses the transformed mobile object predictive model Mc to calculate an estimate value (future value) of the monitored amount of the mobile object, from the obtained image information of the onboard camera C and the radar information of the radar R. The mobile object is a mobile object (obstacle) present in the surroundings of the vehicle body. The monitored amount of the mobile object is, for example, the path of travel, the speed, the fuel consumption, etc. of the mobile object.

The path of travel of the mobile object is the path along which the mobile object moves, during a period spanning into the future from the current time (for example, 5 seconds). The speed of the mobile object is the speed when the mobile object moves during the period spanning into the future from the current time. The fuel consumption of the mobile object is the amount of fuel that the mobile object consumes during the period spanning into the future from the current time.

The transformed mobile object predictive model Mc is obtained by transforming the mobile object predictive model M (for example, refer to FIGS. 2A, 2BA, and 2BB). The mobile object predictive model M is a model that has a multi-layered neural structure and activation functions of a ReLU structure, and that predicts dynamic behavior of a mobile object in the surroundings of the vehicle body.

The mobile object predictive model M, for example, is a model that receives the image information of the onboard camera C (current value, past value) and the radar information of the radar R (current value, past value) as input and outputs an estimate value (future value) of the monitored amount of the mobile object. The image information (current value, past value) and the radar information (current value, past value), for example, are information for the most recent fixed period.

The transformed mobile object predictive model Mc is a model that has upper and lower limit values of input/output variables, bias, and a weight coefficient for each neuron set based on the mobile object predictive model M, and for which the activation function of each neuron is transformed using a linear inequality function that includes a binary variable. The mobile object predictive model M, for example, is created in advance and stored to a storage apparatus such as the memory 302, the disk 304, etc.

In particular, for example, based on the mobile object predictive model M, the first estimating unit 402 sets the bias, weight coefficient, etc. of each neuron of the pre-transformation mobile object predictive model M, as the bias, the weight coefficient, etc. of each neuron of the transformed mobile object predictive model Mc. Further, the first estimating unit 402 sets the upper/lower limit values of variables input to the mobile object predictive model M, as upper/lower limit values of variables input to the transformed mobile object predictive model Mc.

Further, the first estimating unit 402 sets the upper and lower limit values of variables output from the mobile object predictive model M as upper and lower limit values of variables output by the transformed mobile object predictive model Mc. Further, the first estimating unit 402 sets the upper and lower limit values of variables output from each neuron of the mobile object predictive model M, as upper and lower limit values of variables output from each neuron (activation function) of the transformed mobile object predictive model Mc.

The upper and lower limit values of the input/output variables, for example, are set based on maximum and minimum values of the input/output variables, obtained by providing a chirp signal or an APRBS signal as input to the mobile object predictive model M. A chirp signal is a sinusoidal signal that continuously changes a frequency component thereof according to the time of day. An APRBS signal is a signal of a random combination of square amplitudes. An exhaustive test pattern is realized by a chirp signal or APRBS signal, thereby enabling accurate setting of upper and lower limit values of the input/output variables. Further, a range of each input/output variable is suitably set, whereby a high speed, high performance model (the transformed mobile object predictive model Mc) may be generated.

Nonetheless, transformation of the mobile object predictive model M may be performed by the control device 101 or may be performed by another computer different from that of the control device 101. In an instance in which the transformation is performed by another computer, the control device 101 obtains the transformed mobile object predictive model Mc, for example, by a user operation or receives the transformed mobile object predictive model Mc from the other computer.

The second estimating unit 403 calculates an estimate value (future value) of the monitored amount of the vehicle body from a search value of the operation amount for controlling the monitored amount of the vehicle body. The monitored amount of the vehicle body, for example, is the path of travel, the speed, the fuel consumption, etc. of the vehicle body. The path of travel of the vehicle body is the path along which the vehicle body moves during the period spanning into the future from the current time. The speed of the vehicle body is the speed when the vehicle body moves during the period spanning into the future from the current time. The fuel consumption of the vehicle body is the amount of fuel consumed by the vehicle body during the period spanning into the future from the current time.

The operation amount, for example, is the steering amount, the braking amount, the acceleration amount, etc. The search value of the operation amount corresponds to a candidate value of the operation amount for controlling the monitored amount. The search value of the operation amount, for example, is searched for in advance according to a predetermined search rule by the optimizing unit 404 and is provided to the second estimating unit 403 by the optimizing unit 404. The estimate value (future value) of the monitored amount of the vehicle body, for example, represents the monitored amount at the next step when the vehicle body is controlled.

In particular, for example, the second estimating unit 403 uses a vehicle body model of the vehicle body on which the control device 101 of the second estimating unit is equipped and thereby, calculates the estimate value (future value) of the monitored amount of the vehicle body, from the search value of the operation amount for controlling the monitored amount of the vehicle body. Here, the vehicle body model is a model that receives the operation amount of the vehicle body as input and predicts dynamic behavior of the vehicle body.

The vehicle body model is a mathematical model built based on laws of physics, such as equations of motion. The vehicle body model corresponds to the "second model" described with reference to FIG. 1. For example, the vehicle body model receives the steering amount, the braking amount, and the acceleration amount of the vehicle body as input and outputs estimate values of the path of travel, speed, and fuel consumption (energy consumption) of the vehicle body.

To explain in more detail, for example, the second estimating unit 403 inputs the operation amounts (past values) for a previous k-th step (where, k is a natural number of 2 or greater) to the step before the current step, and a search value of the operation amount (current value) for the current time into the vehicle body model and thereby, calculates an estimate value of the monitored amount (path of travel, speed, fuel consumption) of the vehicle body for the period spanning into the future from the current time(for example, 5 seconds). The operation amount (past value) of each past step, for example, is stored to a storage apparatus such as the memory 302, the disk 304, etc.

The optimizing unit 404 determines the value of the operation amount for controlling the monitored amount of the vehicle body, based on the target value of the monitored amount of the vehicle body, the estimate value of the monitored amount of the vehicle body, and the estimate value of the monitored amount of the mobile object (obstacle). In particular, for example, the optimizing unit 404 may determine the value of the operation amount based on an error of the estimate value of the monitored amount (path of travel, speed) of the vehicle body with respect to the target value of the monitored amount (path of travel, speed) of the vehicle body. As a result, the value of the operation amount may be determined with consideration of conformance to the target value (the target path of travel, the target speed) of the monitored amount (path of travel, speed) of the vehicle body.

Further, the optimizing unit 404, for example, may determine the value of the operation amount based on a positional relationship between the vehicle body and the mobile object, identified from the estimate value of monitored amount (path of travel, speed) of the vehicle body and the estimate value of the monitored amount (path of travel, speed) of the mobile object. As a result, the value of the operation amount may be determined with consideration of collision potential of the vehicle body and the mobile object.

Further, the optimizing unit 404, for example, may determine the value of the operation amount based on the estimate value of the monitored amount (fuel consumption) of the vehicle body and the estimate value of the monitored amount (fuel consumption) of the mobile object. As a result, the value of the operation amount may be determined with consideration of the fuel consumption of vehicle body and the fuel consumption of the mobile object.

Further, the optimizing unit 404, for example, may determine the value of the operation amount based on an amount of change of the operation amount. Here, the amount of change of the operation amount, for example, is expressed by a difference of the value of the current operation amount (current value) and a search value of the operation amount. As a result, the value of the operation amount may be determined with consideration of the amount of change of the steering amount, the braking amount, the acceleration amount, etc.

To explain in more detail, for example, the optimizing unit 404 determines the value of the operation amount for controlling the monitored amount of the vehicle body, from among search values of the operation amount, based on the control evaluation value calculated for each search value of the operation amount by the evaluation value calculating unit 405. The control evaluation value represents the cost for controlling the monitored amount of the vehicle body.

Here, for each search value of the operation amount, the evaluation value calculating unit 405 calculates a control evaluation value, based on the calculated estimate value of the monitored amount of the vehicle body, the target value of the monitored amount of the vehicle body, and the estimate value of the monitored amount of the mobile object.

The lower is the value of the control evaluation value, for example, the higher is the evaluation.

In particular, for example, the evaluation value calculating unit 405 may calculate the control evaluation value, based on the positional relationship between the vehicle body and the mobile object, and the error of the estimate value of the monitored amount (path of travel, speed) of the vehicle body with respect to the target value of the monitored amount (path of travel, speed) of the vehicle body. Here, the error of the estimate value with respect to the target value of the monitored amount (path of travel, speed), for example, is expressed by an error between the position of the vehicle body based on the target path of travel and the target speed, and the position of the vehicle body based on the estimate values of the path of travel and speed of the vehicle body.

For example, each path of travel (the target path of travel, the estimate value of path of travel) is assumed to be a path of travel during a period of 5 seconds from the current time. In this instance, the evaluation value calculating unit 405 calculates the position of the vehicle body every 1 second, based on the target path of travel and the target speed. Further, the evaluation value calculating unit 405 calculates the position of vehicle body every 1 second, based on the estimate value of the speed and the estimate value of the path of travel of the vehicle body. Further, the evaluation value calculating unit 405 may calculate the error of the estimate value with respect to the target value of the monitored amount (path of travel, speed) by totaling the error between the positions calculated every 1 second.

Further, the error of the estimate value with respect to the target value of the monitored amount (path of travel, speed) may be a combination of the difference of the estimate value of the path of travel and the target path of travel, and the difference of the estimate value of the speed and the target speed. The difference of the estimate value of the path of travel and the target path of travel, for example, may be expressed by the degree of similarity in shape of the paths of travel.

The positional relationship between the vehicle body and the mobile object, for example, may be expressed by a presence/absence of an intersection between the estimate value of the path of travel of the vehicle body and the estimate value of the path of travel of the mobile object. As a result, the control evaluation value may be calculated with consideration of the collision potential of the vehicle body and the mobile object, by an intersection of the paths of travel.

Further, the positional relationship between the vehicle body and the mobile object may be expressed by an error between the position of the vehicle body based on the estimate value of the speed and the estimate value of the path of travel of the vehicle body, and the position of the mobile object based on the estimate value of the speed and the estimate value of the path of travel of the mobile object. As a result, the control evaluation value may be calculated with consideration of the collision potential, by the distance between the vehicle body and the mobile object.

Further, the evaluation value calculating unit 405 may further calculate the control evaluation value based on the estimate value of the monitored amount (fuel consumption) of the vehicle body and the estimate value of the monitored amount of the mobile object (fuel consumption). Further, the evaluation value calculating unit 405 may further calculate the control evaluation value, based on the amount of change of the operation amount (difference of the current value and the search value of the operation amount).

To explain in more detail, for example, the evaluation value calculating unit 405 uses the evaluation function ef and calculates a control evaluation value, for each search value of the operation amount. The evaluation function ef, for example, like formula (11) below, includes a first term C1, a second term C2, a third term C3, a fourth term C4, and a fifth term C5 and is a cost function in which each term C1 to C5 is weighted. Where, "E" is the control evaluation value. "a", "b", "c", "d", and "e" are weight coefficients.

$$E=a*C1+b*C2+c*C3+d*C4+e*C5 \qquad (11)$$

Here, the first term C1 is a term that takes into consideration, the error of the estimate value of the monitored amount (path of travel, speed) of the vehicle body with respect to the target value of the monitored amount (path of travel, speed) of the vehicle body. A value of the first term C1, for example, is greater, the greater is the error of the estimate value with respect to the target value of the monitored amount (path of travel, speed).

The second term C2 is a term that takes into consideration, a presence/absence of an intersection between the estimate value of the path of travel of the vehicle body and the estimate value of the path of travel of the mobile object. A value of the second term C2, for example, is "1" when the paths of travel of the vehicle body and the mobile object intersect and is "0" when the paths of travel do not intersect. The third term C3 is a term that takes into consideration, the error between the position of the vehicle body based on the estimate value of the speed and the estimate value of the path of travel of the vehicle body, and the position of the mobile object based on the estimate value of the speed and the estimate value of the path of travel of the mobile object. A value of the third term C3, for example, is greater, the greater is the error between the position of the vehicle body and that of the mobile object.

The fourth term C4 is a term that takes into consideration, the estimate value of the fuel consumption of the vehicle body and the estimate value of the fuel consumption of the mobile object. A value of the fourth term C4, for example, is greater, the greater are the fuel consumption of the vehicle body and the fuel consumption of the mobile object. The fifth term C5 is a term that takes into consideration, a difference of the current value of the operation amount and the search value of the operation amount. A value of the fifth term C5, for example, is greater, the greater is the amount of change of the operation amount.

Each of the weight coefficients a to e may be arbitrarily set. For example, each of the weight coefficients a to e is set to suitably compare the terms with one another (normalized). Further, each of the weight coefficients a to e is set according to a priority thereof. For example, the greater is the value of the weight coefficient b, the greater is the control evaluation value when the paths of travel of the vehicle body and the mobile object intersect.

Further, the optimizing unit 404, for example, based on the calculated control evaluation value, determines the value of the operation amount for controlling the monitored amount, from among search value of the operation amount. To explain in more detail, for example, the optimizing unit 404 determines the search value for which the control evaluation value is smallest among the search values, to be the value of the operation amount for controlling the monitored amount of the vehicle body.

Operation amount searches by the optimizing unit 404, for example, may be performed until the amount of change of the control evaluation value that is smallest substantially disappears or for a specified number of iterations.

Further, the optimizing unit 404 outputs the determined value of the operation amount. In particular, for example, the optimizing unit 404 outputs the determined value of the operation amount to an autonomous driving control unit, as the operation amount when the monitored amount is controlled at the next step. The autonomous driving control unit is a controller for controlling autonomous driving.

The autonomous driving control unit, for example, controls the vehicle body by adjusting the steering amount, the braking amount, and the acceleration amount of the vehicle body, based on the value of the operation amount output from the control device 101 (the optimizing unit 404). The autonomous driving control unit, for example, is an engine control unit (ECU).

In particular, for example, at the autonomous driving control unit, by various types of actuators under the control of a controller, the operation amount (the steering amount, the braking amount, the acceleration amount) at the next step is adjusted to the value output as the operation amount. As a result, the monitored amount (for example, path of travel, speed, fuel consumption) of the automotive vehicle is controlled.

Further, the activation functions of a ReLU structure included in the mobile object predictive model M, for example, may be a Leaky ReLU structure. A Leaky ReLU structure is a function that varies the output value linearly in both an instance in which the input value to the function is 0 or less and an instance in which the input value is greater than 0, and for which the slope differs at a border of 0. The activation functions included in the mobile object predictive model M are set as activation functions of a Leaky ReLU structure, whereby the accuracy of predicting dynamic behavior of the mobile object may be enhanced.

The control device 101, for example, may be implemented by the autonomous driving control unit of the automotive vehicle (controlled object). In this instance, the control device 101, for example, controls the vehicle body by adjusting the steering amount, the braking amount, and the acceleration amount of the vehicle body, based on the determined value of the operation amount. Further, the control device 101 may be implemented by another computer capable of communicating with the autonomous driving control unit of the automotive vehicle (controlled object). This other computer, for example, may be a server, a smartphone, a personal computer (PC), etc.

Further, the control device 101 may be implemented by, for example, a programmable logic device (PLD) such as FPGA or an application-specific IC such as a standard cell or structured application specific integrated circuit (ASIC).

Next, a procedure of the control processes of the control device 101 is described.

Figure 5:
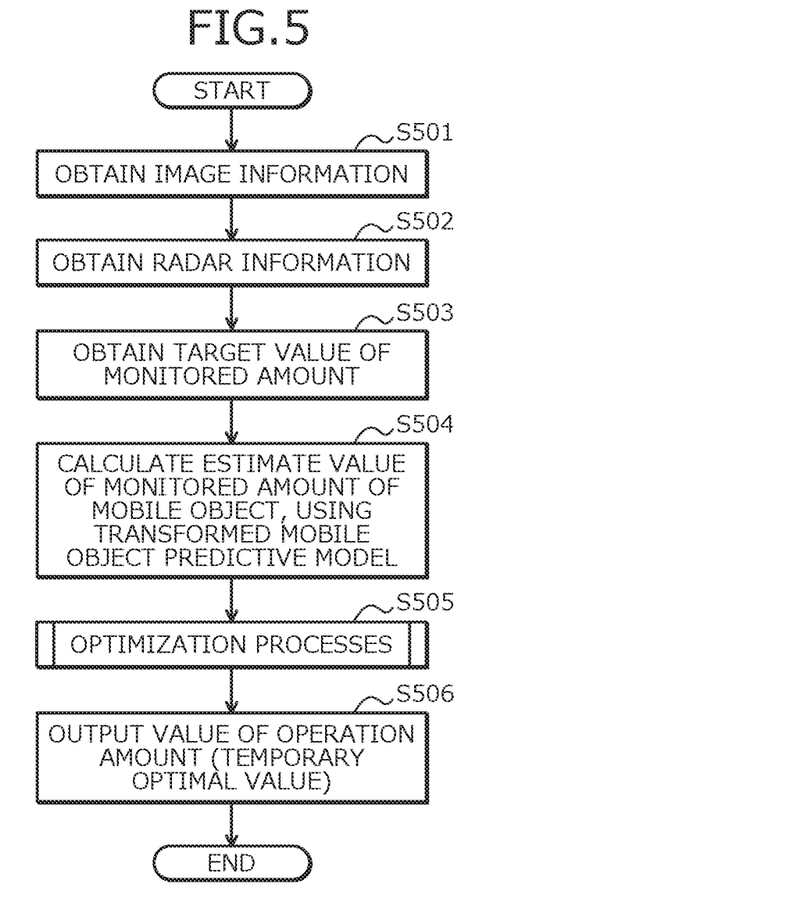
FIG. 5 is a flowchart depicting an example of a procedure of control processes of the control device 101.

FIG. 5 is a flowchart depicting an example of a procedure of the control processes of the control device 101. In the flowchart depicted in FIG. 5, first, the control device 101 obtains image information from the onboard camera C equipped on the vehicle body on which the control device 101 is provided (step S501). Next, the control device 101 obtains radar information from the radar R equipped on the vehicle body (step S502).

Next, the control device 101 obtains a target value of the monitored amount from the navigation system of the vehicle body (step S503). Subsequently, the control device 101 uses the transformed mobile object predictive model Mc to calculate an estimate value (future value) of the monitored amount of the mobile object, from the obtained image information and radar information (step S504).

Next, the control device 101 executes optimization processes (step S505). The optimization processes are processes that optimize the operation amount for controlling the monitored amount of the vehicle body. A procedure of the optimization processes is described in detail with reference to FIG. 6.

Further, the control device 101 outputs a value of the operation amount that is a temporary optimal value saved at the optimization processes (step S506), and a series of processes according to the present flowchart ends.

Next, a procedure of the optimization processes at step S505 depicted in FIG. 5 is described in detail with reference to FIG. 6.

Figure 6:
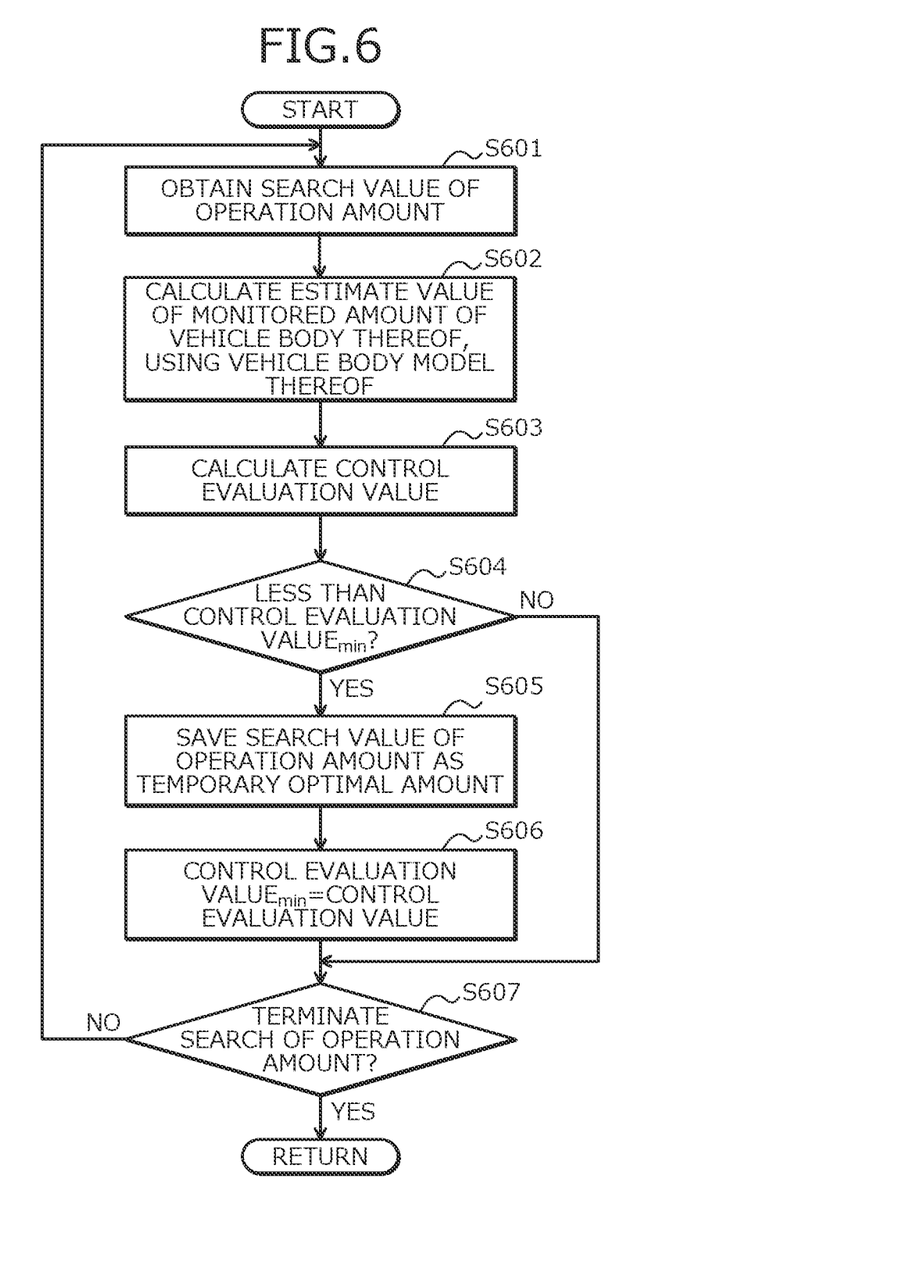
FIG. 6 is a flowchart depicting an example of a procedure of optimization processes in detail.

FIG. 6 is a flowchart depicting an example of a procedure of the optimization processes in detail. In the flowchart depicted in FIG. 6, first, the control device 101 obtains a search value of the operation amount for controlling the monitored amount of the vehicle body (step S601). Subsequently, the control device 101 uses the vehicle body model to calculate an estimate value (future value) of the monitored amount of the vehicle body, from the obtained search value of the operation amount (step S602).

Next, the control device 101 uses the evaluation function of to calculate a control evaluation value, based on the estimate value of the monitored amount (path of travel, speed, fuel consumption) of the vehicle body, the target value of the monitored amount (path of travel, speed) of the vehicle body, the estimate value of the monitored amount of the mobile object (path of travel, speed, fuel consumption), and the amount of change of the operation amount (step S603). The amount of change of the operation amount, for example, is expressed by the difference of the current value of the operation amount and the search value of the operation amount.

Further, the control device 101 judges whether the calculated control evaluation value is less than a control evaluation value$_{min}$ (step S604). The control evaluation value$_{min}$ is "null" in an the initial state. At step S604, when the control evaluation value$_{min}$ is in the initial state, the control device 101 transitions to step S605.

Here, when the control evaluation value is at least equal to the control evaluation value$_{min}$ (step S604: NO), the control device 101 transitions to step S607. On the other hand, when the control evaluation value is less than the control evaluation value$_{min}$ (step S604: YES), the control device 101 saves the obtained search value of the operation amount as a temporary optimal value (step S605).

Further, the control device 101 sets the calculated control evaluation value as the control evaluation value$_{min}$ (step S606). Next, the control device 101 judges whether to terminate the operation amount search (step S607). The operation amount search, for example, is performed until the amount of change of the control evaluation value$_{min}$ substantially disappears or for a specified number of iterations.

Here, when the operation amount search is not to be terminated (step S607: NO), the control device 101 returns to step S601, and obtains a new search value of the operation amount. On the other hand, when the operation amount search is to be terminated (step S607: YES), the control device 101 returns to the step that called up the optimization processes.

As a result, the control device 101 may quickly and accurately predict dynamic behavior of the mobile object by using the transformed mobile object predictive model Mc that is the mobile object predictive model M, which has the activation functions of a ReLU structure and which has been transformed using a linear inequality function that includes a binary variable. Further, with consideration of the dynamic behavior of the mobile object, the control device 101 may search for an operation amount that causes the monitored amount of the vehicle body to conform to the target value.

As described above, according to the control device 101 according to the embodiment, the image information of the onboard camera C and the radar information of the radar R equipped on the vehicle body on which the control device 101 is provided are obtained, and an estimate value (future value) of the monitored amount of the mobile object may be calculated from the obtained image information and radar information, using the transformed mobile object predictive model Mc. Further, according to the control device 101, an estimate value (future value) of the monitored amount of the vehicle body may be calculated from a search value of the operation amount for controlling the monitored amount of the vehicle body. The estimate value of the monitored amount of the vehicle body, for example, is calculated from the search value of the operation amount, using the vehicle body model that receives the operation amount of the vehicle body as input and predicts dynamic behavior of vehicle body. Further, according to the control device 101, the target value of the monitored amount of the vehicle body may be obtained. Further, according to the control device 101, the value of the operation amount for controlling the monitored amount of the vehicle body may be determined based on the target value of the monitored amount of the vehicle body, the estimate value of the monitored amount of the vehicle body, and the estimate value of the monitored amount of the mobile object; and the determined value of the operation amount may be output. The operation amount, for example, is the steering amount, the braking amount, and the acceleration amount.

As a result, the control device 101 uses a model (the transformed mobile object predictive model Mc) capable of accurately predicting the dynamic behavior of the mobile object (obstacle) around the controlled object, thereby enabling high-performance, high-speed autonomous driving control to be implemented. For example, the control device 101 may perform autonomous driving control that avoids collisions with the mobile object (obstacle) and conforms to the target values of the vehicle body as much as possible.

Further, according to the control device 101, for each search value of the operation amount, a control evaluation value representing the cost for controlling the monitored amount of the vehicle body is calculated based on the target value of the monitored amount of the vehicle body, the estimate value of the monitored amount of the vehicle body, and the estimate value of the monitored amount of the mobile object; and the value of the operation amount for controlling the monitored amount of the vehicle body may be determined from among the search values of the operation amount, based on the calculated control evaluation values.

As a result, from among the search values of the operation amount, the control device 101 may determine the search value for which the cost of controlling the monitored amount of the vehicle body is low to be the value of the operation amount for controlling the monitored amount of the vehicle body.

Further, according to the control device 101, the control evaluation value may be calculated based on the error of the estimate value of the monitored amount (path of travel, speed) of the vehicle body with respect to the target value of the monitored amount (path of travel, speed) of the vehicle body, and the positional relationship between the vehicle body and the mobile object.

As a result, the control device 101 may determine the value of the operation amount for controlling the monitored amount of the vehicle body with consideration of conformance to the target value (the target path of travel, the target speed) of the monitored amount (path of travel, speed) of the vehicle body and the collision potential between the vehicle body and the mobile object.

Further, according to the control device 101, the control evaluation value may be calculated based on a presence/absence of an intersection between the estimate value of the path of travel of the vehicle body and the estimate value of the path of travel of the mobile object.

As a result, the control device 101 may determine the value of the operation amount for controlling the monitored amount of the vehicle body with consideration of collision potential between the vehicle body and the mobile object, by an intersection of the paths of travel.

Further, according to the control device 101, the control evaluation value may be calculated based on the error between the position of the vehicle body based on the estimate value of the speed and path of travel of the vehicle body, and the position of the mobile object based on the estimate value of the speed and path of travel of the mobile object.

As a result, the control device 101 may determine the value of the operation amount for controlling the monitored amount of the vehicle body with consideration of the collision potential, by the distance between the vehicle body and the mobile object.

Further, according to the control device 101, the control evaluation value may be calculated based on the estimate value of the monitored amount (fuel consumption) of the vehicle body and the estimate value of the monitored amount of the mobile object (fuel consumption).

As a result, the control device 101 may determine the value of the operation amount for controlling the monitored amount of the vehicle body so that fuel consumption of the vehicle body and/or the mobile object is suppressed.

Further, according to the control device 101, the control evaluation value may be calculated based on the difference of the current value and search value of operation amount.

As a result, with consideration of the possibility of failure of the actuator when the operation amount is rapidly changed, the control device 101 may determine the value of the operation amount for controlling the monitored amount of the vehicle body so that steep changes in the operation amount are suppressed.

Further, according to the control device 101, the activation functions included in the mobile object predictive model M may be activation functions of a Leaky ReLU structure.

As a result, the control device 101 may enhance the accuracy in predicting the dynamic behavior of a mobile object in the surroundings of the vehicle body.

Thus, according to the control device 101 of the embodiment, the path of travel during autonomous driving may be optimized and controllability of the vehicle body may be enhanced. Further, for example, the control device 101 is provided in the autonomous driving control unit, whereby real-time onboard control of the vehicle body becomes possible.

The control method described in the present embodiment may be implemented by executing a prepared program on a computer such as a personal computer and a workstation. The program is stored on a non-transitory, computer-readable recording medium such as a hard disk, a flexible disk, a CD-ROM, a DVD, a USB memory, and is read out from the computer-readable medium and executed by the computer. Further, this control program may be distributed through a network such as the Internet.

According to one aspect of the present invention, an effect is achieved in that high-performance, high-speed autonomous driving control may be realized.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device, comprising:
    a transformed first model for which a weight coefficient, a bias, and upper and lower limit values of an input/output variable of a neuron are set based on a first model and in which an activation function of the neuron is transformed using a linear inequality function that includes a binary variable, the first model having a multi-layered neural structure and the activation function of a rectified linear unit (ReLU) structure, the first model receiving, as input, information of a sensor equipped on a controlled object, the first model predicting dynamic behavior of a mobile object in a surroundings of the controlled object;
    a memory; and
    a processor coupled to the memory, the processor configured to:
        obtain the information of the sensor and a target value of a monitored amount of the controlled object;
        use the transformed first model to calculate an estimate value, as a future value, of a monitored amount of the mobile object, from the information of the sensor;
        calculate an estimate value, as a future value, of the monitored amount of the controlled object, from a candidate value of an operation amount for controlling the monitored amount of the controlled object; and
        determine a value of the operation amount for controlling the monitored amount of the controlled object, based on the target value of the monitored amount of the controlled object, the estimate value of the monitored amount of the controlled object, and the estimate value of the monitored amount of the mobile object.

2. The control device according to claim 1, wherein the estimate value of the monitored amount of the controlled object is calculated from the candidate value of the operation amount, using a second model that receives the operation amount of the controlled object as input and predicts dynamic behavior of the controlled object.

3. The control device according to claim 1, wherein the candidate value of the operation amount includes a plurality of candidate values, and
    the processor:
        for each of the plurality of candidate values, calculates a respective control evaluation value representing a cost for controlling the monitored amount of the controlled object, the respective control evaluation value being calculated based on the calculated estimate value of the monitored amount of the controlled object, the target value of the monitored amount of the controlled object, and the estimate value of the monitored amount of the mobile object; and
        based on the calculated respective control evaluation value, determines the value of the operation amount for controlling the monitored amount of the controlled object, from among the plurality of candidate values.

4. The control device according to claim 3, wherein the monitored amount of the controlled object includes a path of travel and a speed of the controlled object,
    the monitored amount of the mobile object includes a path of travel and a speed of the mobile object, and
    the processor:
        calculates the respective control evaluation value, based on an error of the estimate value of the monitored amount of the controlled object with respect to the target value of the monitored amount of the controlled object, and a positional relationship between the controlled object and the mobile object, the positional relationship being identified from the estimate value of the monitored amount of the controlled object and the estimate value of the monitored amount of the mobile object.

5. The control device according to claim 4, wherein the positional relationship is expressed by a presence or absence of an intersection of the estimate value of the path of travel of the controlled object and the estimate value of the path of travel of the mobile object.

6. The control device according to claim 4, wherein the positional relationship is expressed by an error between a position of the controlled object based on an estimate value of the speed and the path of travel of the controlled object, and a position of the mobile object based on an estimate value of the speed and the path of travel of the mobile object.

7. The control device according to claim 4, wherein the monitored amount of the controlled object includes fuel consumption of the controlled object,
    the monitored amount of the mobile object includes fuel consumption of the mobile object, and
    the processor calculates the respective control evaluation value, based on an estimate value of the fuel consumption of the controlled object and an estimate value of the fuel consumption of the mobile object.

8. The control device according to claim 4, wherein the processor calculates the respective control evaluation value, based on a difference of a current value of the operation amount and the candidate value of the operation amount.

9. The control device according to claim 1, wherein the operation amount is a steering amount, a braking amount, and an acceleration amount.

10. The control device according to claim 1, wherein the processor outputs the determined value of the operation amount.

11. The control device according to claim 1, wherein the information of the sensor includes image information of a camera equipped on the controlled object.

12. The control device according to claim 1, wherein the information of the sensor includes information of at least any one of light detection and ranging (LiDAR), millimeter wave radar, and an ultrasonic sensor.

13. The control device according to claim 1, wherein
the upper and lower limit values of the input/output variable are set based on a maximum value and a minimum value of the input/output variable, obtained by providing a chirp signal or an amplitude pseudo random binary signal (APRBS) signal as the input to the first model.

14. The control device according to claim 1, wherein
the activation function is a Leaky ReLU structure.

15. The control device according to claim 1, wherein
the target value of the monitored amount of the controlled object is obtained from a navigation system equipped on the controlled object.

16. A control method executed by a processor, the control method comprising:
obtaining information of a sensor equipped on a controlled object and a target value of a monitored amount of the controlled object;
calculating an estimate value, as a future value, of a monitored amount of a mobile object, from the obtained information of the sensor, using a transformed first model for which a weight coefficient, a bias, and upper and lower limit values of an input/output variable of a neuron are set based on a first model and in which an activation function of the neuron is transformed using a linear inequality function that includes a binary variable, the first model having a multi-layered neural structure and the activation function of a rectified linear unit (ReLU) structure, the first model receiving, as input, the information of the sensor, the first model predicting dynamic behavior of the mobile object in a surroundings of the controlled object;
calculating an estimate value, as a future value, of the monitored amount of the controlled object, from a candidate value of an operation amount for controlling the monitored amount of the controlled object; and
determining a value of the operation amount for controlling the monitored amount of the controlled object, based on the obtained target value of the monitored amount of the controlled object, the calculated estimate value of the monitored amount of the controlled object, and the calculated estimate value of the monitored amount of the mobile object.

17. A computer-readable recording medium storing therein a control program executable by a processor, the control program comprising:
an instruction for obtaining information of a sensor equipped on a controlled object and a target value of a monitored amount of the controlled object;
an instruction for calculating an estimate value, as a future value, of a monitored amount of a mobile object, from the obtained information of the sensor, using a transformed first model for which a weight coefficient, a bias, and upper and lower limit values of an input/output variable of a neuron are set based on a first model and in which an activation function of the neuron is transformed using a linear inequality function that includes a binary variable, the first model having a multi-layered neural structure and the activation function of a rectified linear unit (ReLU) structure, the first model receiving, as input, the information of the sensor, the first model predicting dynamic behavior of the mobile object in a surroundings of the controlled object;
an instruction for calculating an estimate value, as a future value, of the monitored amount of the controlled object, from a candidate value of an operation amount for controlling the monitored amount of the controlled object; and
an instruction for determining a value of the operation amount for controlling the monitored amount of the controlled object, based on the obtained target value of the monitored amount of the controlled object, the calculated estimate value of the monitored amount of the controlled object, and the calculated estimate value of the monitored amount of the mobile object.

* * * * *